Aug. 18, 1959 D. C. SIMS 2,900,151
SPOON AND FORK REST FOR KITCHEN UTENSILS
Filed May 31, 1955
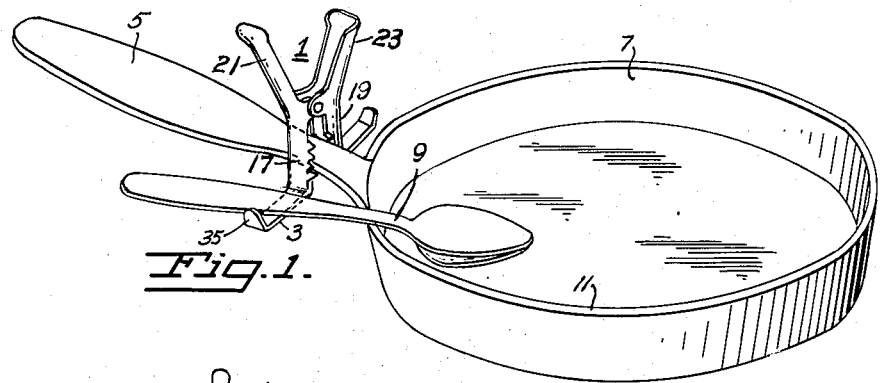
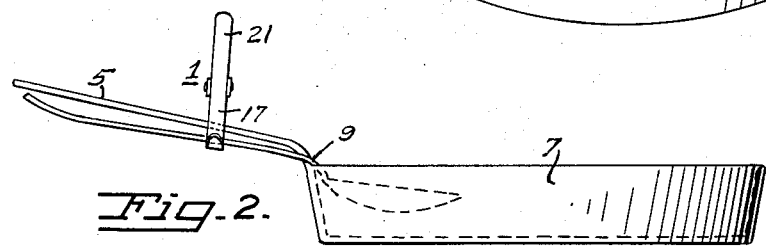
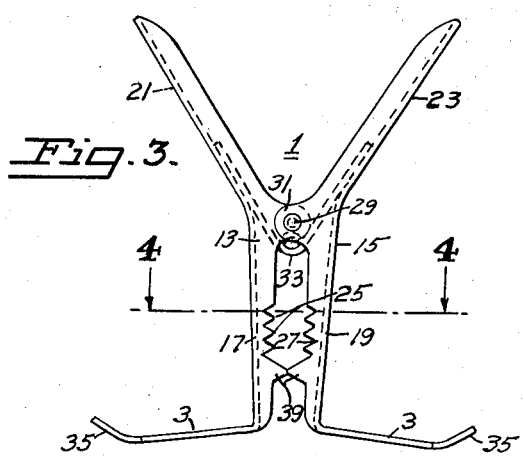
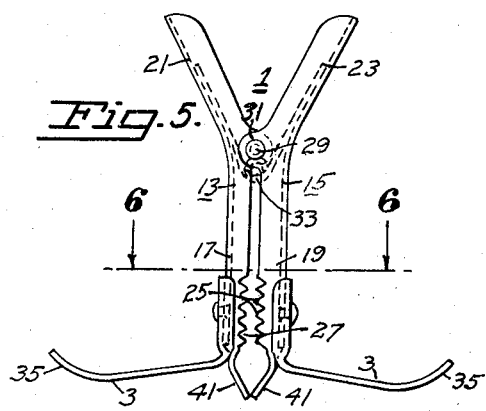
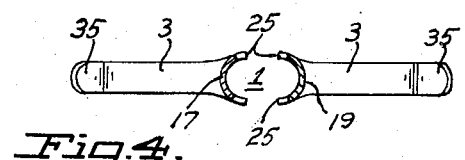
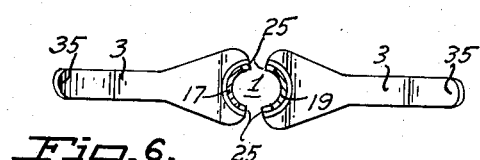
INVENTOR.
DON C. SIMS
BY
Bruce & Brosler
HIS ATTORNEYS United States Patent Office 2,900,151
Patented Aug. 18, 1959

2,900,151

SPOON AND FORK REST FOR KITCHEN UTENSILS

Don C. Sims, Berkeley, Calif.

Application May 31, 1955, Serial No. 512,118

3 Claims. (Cl. 248—37.3)

My invention relates to cooking equipment and more particularly to a spoon and fork rest for use with kitchen utensils.

In the field of cooking, the disposition of spoons, forks, or the like employed by the cook in mixing or testing foods, has always been a problem, especially when the cook is particular against permitting drippings from falling upon the floor or surface of the stove. A dish is sometimes used for the purpose, but this not only makes for additional work, but unless the cook is careful, drippings may occur during the transfer of the implement from the pot or pan to such dish.

On the other hand, should the cook indulge in the practice of leaving the spoon or fork stand in the utensil in which cooking is taking place, such spoon or fork is apt to become dangerously hot to handle, without the use of padded mits.

Among the objects of the present invention are:

(1) To provide a novel and improved spoon and fork rest for kitchen use;

(2) To provide a novel and improved spoon and fork rest for use in conjunction with a pot or pan or similar utensil, and particularly those having handles extending outwardly therefrom; and (3) To provide a novel and improved spoon and fork rest which will permit drippings to fall into the utensils from which the fork or spoon may have just been removed.

(4) To provide a novel and improved spoon and fork rest which will maintain a spoon or fork relatively cool while permitting drippings therefrom to fall into the utensil from which such spoon or fork may have just been removed.

Additional objects of my invention will be brought out in the following description of the same taken in conjunction with the accompanying drawings, wherein Figure 1 is a three dimensional view depicting the manner of use of the present invention;

Figure 2 is a side elevational view of the assembly of Figure 1;

Figure 3 is a front elevational view of one embodiment of the present invention;

Figure 4 is a view in section taken in the plane 4—4 of Figure 3;

Figure 5 is a front elevational view of a second embodiment of the present invention;

Figure 6 is a view in section taken in the plane 6—6 of Figure 5.

Referring to the drawings for details of my invention, the same in general, takes the form of a clip 1 having at least one and preferably a pair of supporting arms 3 extending laterally therefrom, the clip being so designed as to be removably attachable to an outwardly extending handle 5 with which a utensil 7 may be provided. When so placed, a spoon 9 or fork, may be supported between the rim 11 of the utensil and one of the laterally extending arms of the clip, with the bowl of the spoon, or the tines of the fork disposed within the boundaries of the utensil whereby any drippings therefrom will fall therein.

Such clip in one embodiment of the invention, involves a pair of lever components 13, 15 with means for pivotally securing them together at a corresponding intermediate point on each of such components, to provide a pair of opposing jaws 17, 19 to one side of the pivot means and a pair of opposing finger grips 21, 23 on the opposite side of such pivot means, such finger grips being angularly spread to facilitate a wide opening of the jaws.

Each lever component is preferably of channel construction to provide a pair of edges along each jaw, facing opposing edges of the opposite jaw. These edges are serrated to form a plurality of saw teeth 25 with intervening notches 27.

The pivot means includes a pin or rivet 29 passing through overlapping wing extensions 31 on the lever components.

The jaws are normally maintained closed by a coil spring 33 disposed between the jaws adjacent the pivot pin, with the ends of the coil extending along and bearing against the opposing walls of the finger grips, to bring about a normally closed relationship of the jaws. In the alternative, the coil spring may be disposed about the pivot pin.

Laterally extending from each jaw is the supporting arm 3, which terminates at its free ends, in an upturned tip 35. In one embodiment of the invention as depicted in Figure 3, each of such arms may be formed as an integral extension of its associated jaw, while in another form of the invention as illustrated in Figure 5, each arm may be formed as an independent element and riveted to its associated jaw.

The spoon and fork rest of the present invention is particularly applicable to utensils having outwardly extending handles to which the clip may be readily removably secured as shown in Figure 1. When secured to such a handle, the spoon or fork may be disposed across the supporting arm of the clip and the rim of the utensil, with the bowl of the spoon or the tines of the fork located within the boundaries of the utensil, whereby any drippings therefrom will fall into the pot or pan on which it rests.

The plurality of saw teeth with intervening notches formed in the edges of the jaws, permit of elevational adjustments of the clip on the handle, whereby to assure that the handle portion of the spoon or fork, will be at a slight elevation above that of the other end, to encourage dripping from the bowl or tines of the implement, as the case may be.

To protect against the clip, when attached to a pot handle, from being accidentally knocked off, guard means are provided. In the clip with the integral supporting arms, such guard means may take the form of opposing sets of guard teeth 39 of larger size than the saw teeth 25. With the other form of clip, the jaws, at their lower ends 41, may be bent toward each other.

From the foregoing description of my invention, it will be apparent that the same fulfills all the objects thereof, and while I have illustrated and described two embodiments of my invention in considerable detail, the same is subject to further alteration or modification without departing from the underlying principles thereof, and I accordingly do not desire to be limited in my protection to those specific details illustrated and described, except as may be necessitated by the appended claims.

I claim:

1. A spoon and fork rest for kitchen utensils such as pots and pans, comprising a clip involving a pair of lever components, means pivotally securing said lever components together at a corresponding intermediate point of each to provide a pair of opposing jaws to one side of said pivotal securing means, and a pair of finger grips to the other side of said pivotal securing means, and a spoon and fork supporting arm extending from each of said jaws.

2. A spoon and fork rest for kitchen utensils such as pots and pans, comprising a clip involving a pair of lever components, means pivotally securing said lever components together at a corresponding intermediate point of each to provide a pair of opposing jaws to one side of said pivotal securing means, and a pair of finger grips to the other side of said pivotal securing means, and a spoon and fork supporting arm extending laterally from each of said jaws, and means for adjusting the elevation of such supporting arms with respect to the point of attachment of said clip when applied to the utensil.

3. A spoon and fork rest for kitchen utensils such as pots and pans, comprising a clip involving a pair of lever components, means pivotally securing said lever components together at a corresponding intermediate point of each to provide a pair of opposing jaws to one side of said pivotal securing means, and a pair of finger grips to the other side of said pivotal securing means, and at least one supporting arm extending laterally from one of said jaws and integral therewith, and means for adjusting the elevation of such supporting arm with respect to the utensil to which the clip is secured, said means involving a plurality of saw teeth with intervening notches formed on said jaws.

References Cited in the file of this patent

UNITED STATES PATENTS

| | | |
|---|---|---|
| 46,682 | Morse et al. | Mar. 7, 1865 |
| 498,569 | Peterson | May 30, 1893 |
| 897,840 | Martin et al. | Dec. 19, 1905 |
| 1,182,732 | Avery | May 9, 1916 |
| 1,327,982 | Burns | Jan. 13, 1920 |
| 1,577,510 | Wyman | Mar. 23, 1926 |
| 2,314,755 | Ballarino | Mar. 23, 1943 |
| 2,368,898 | Swift | Feb. 6, 1945 |
| 2,371,537 | Mangini | Mar. 13, 1945 |
| 2,530,470 | Kenly | Nov. 21, 1950 |
| 2,658,363 | Simmons | Nov. 10, 1953 |

FOREIGN PATENTS

| | | |
|---|---|---|
| 22,617 | Great Britain | Nov. 20, 1913 |
| 28,553 | Austria | May 25, 1907 |
| 672,195 | Germany | Feb. 22, 1939 |